April 13, 1954

S. BIRKLAND 2,675,203

WEIGHING AND FILLING MACHINE

Filed May 8, 1951

INVENTOR.
STELLAN BIRKLAND
BY
*Charles H. Erne*
*Ivan D. Thornburgh*
ATTORNEYS

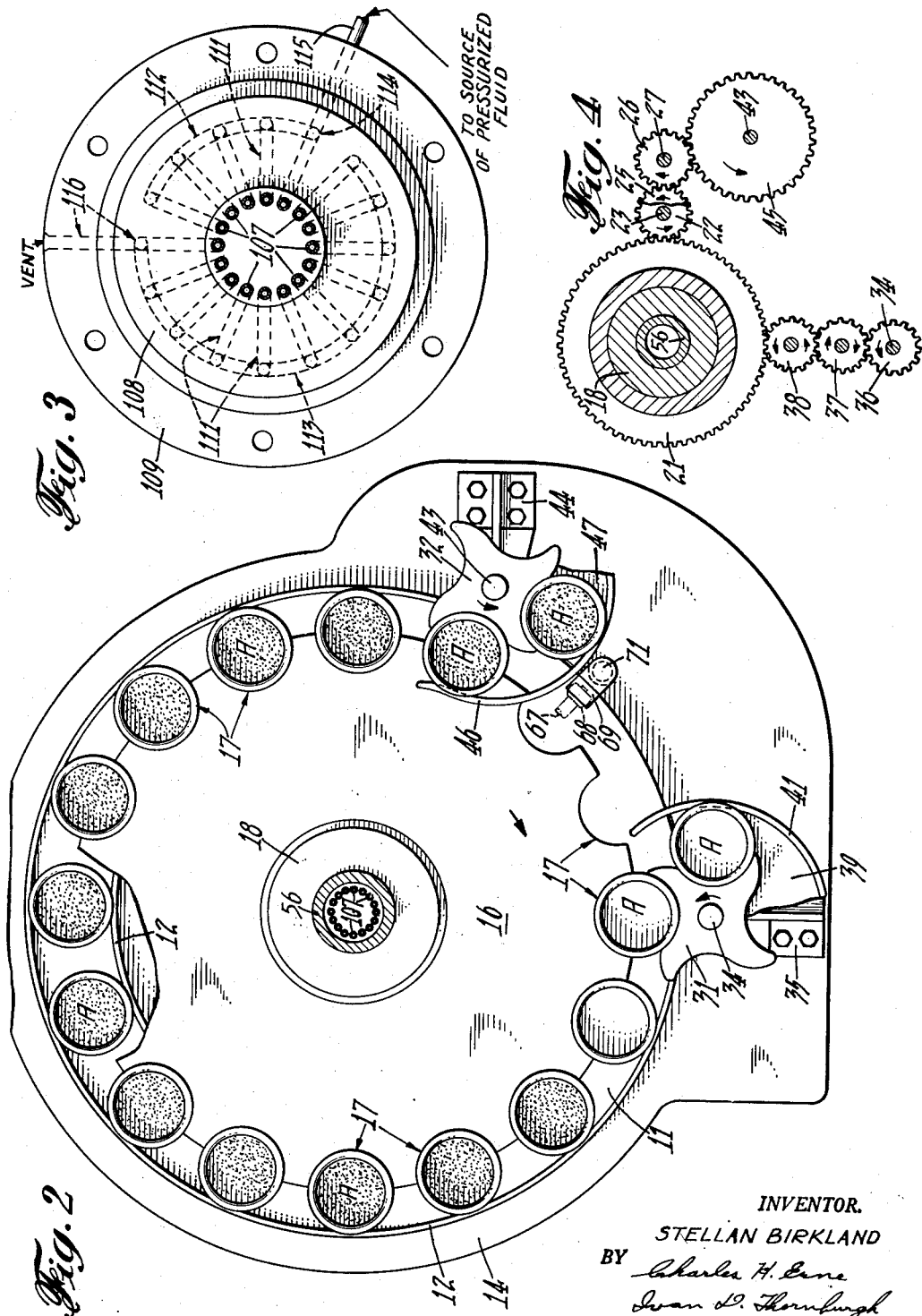

April 13, 1954

S. BIRKLAND 2,675,203

WEIGHING AND FILLING MACHINE

Filed May 8, 1951

INVENTOR.
STELLAN BIRKLAND
BY
ATTORNEYS

Patented Apr. 13, 1954

2,675,203

UNITED STATES PATENT OFFICE 2,675,203

WEIGHING AND FILLING MACHINE

Stellan Birkland, San Francisco, Calif., assignor to American Can Company, New York, N. Y., a corporation of New Jersey Application May 8, 1951, Serial No. 225,084

5 Claims. (Cl. 249—11)

The present invention relates to a machine for weighing and filling granular products such as coffee and the like into cans or containers and has particular reference to devices for weighing the product into individual charges of a predetermined weight prior to filling the charges into the cans.

This is a companion application to my copending United States applications Serial No. 225,086, filed May 8, 1951, by Stellan Birkland and Malcolm W. Loveland, on Machine for Weighing, Filling and Sealing Products into Containers, and Serial No. 225,085, filed May 8, 1951, by Stellan Birkland, on Transfer Device for Pressurized Compartment.

An object of the invention is the provision in a weighing and filling machine of novel weighing devices which are sensitive and quick acting, and are particularly adapted for use in a continuous operation machine in which the weighing of a unit charge of the product and the filling of the charge into a can is effected while the cans pass through the machine in a continuous procession in spaced and timed order and at a high rate of speed.

Numerous other objects and advantages of the invention will be apparent as it is better understood from the following description, which, taken in connection with the accompanying drawings, discloses a preferred embodiment thereof.

Referring to the drawings:

Fig. 2 is a top plan sectional view taken substantially along the line 2—2 in Fig. 1, with parts broken away;

Fig. 3 is an enlarged top plan detailed view of a valve device located in the bottom of the machine shown in Fig. 1;

Fig. 4 is a plan view of a gear train located in the bottom of the machine shown in Fig. 1.

Figure 1:
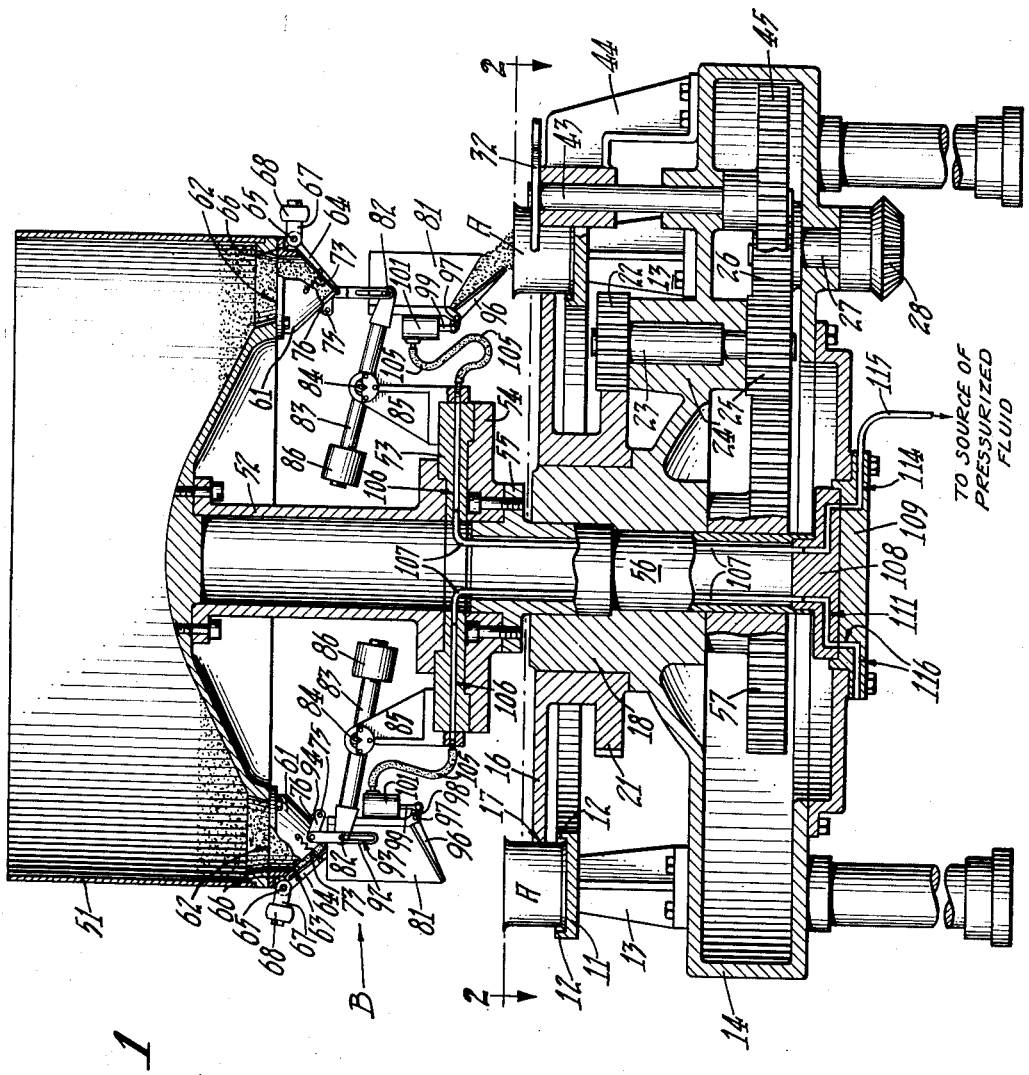
Figure 1 is a vertical sectional view of a machine embodying the instant invention, with parts broken away.

As a preferred or exemplary embodiment of the instant invention the drawings illustrate a rotary type multiple head weighing and filling machine for weighing out individual or unit charges of granular product such as coffee or the like and for filling the charges into individual cans A as the cans advance into and pass through the machine in a constantly moving substantially continuous procession and in spaced and timed order.

In such a machine the cans A, disposed in an upright position, are advanced along a circular path of travel while the unit charges of the product are weighed and are filled into the cans. During this travel of the cans through the machine, they are supported on a ring shaped horizontal table 11 (Figs. 1 and 2) having upright concentric guides 12 formed on the inner and the outer edges of the table to retain the cans in place and guide them along their curved path of travel. The table is supported on brackets 13 which extend up from a hollow base 14 which constitutes the main frame of the machine.

The cans A are propelled along the table 11 by a continuously rotating horizontal turret 16 having a plurality of spaced peripheral pockets 17 for receiving and propelling the cans. The turret 16 is disposed concentrically with and just above the ring shaped table 11 and is mounted for rotation on a shouldered column 18 which extends up from the machine base 14. The turret 16 is rotated in a clockwise direction as viewed in Fig. 2 by a gear 21 which preferably is formed integrally with the turret. The gear 21 meshes with and is driven by a pinion 22 (Figs. 1 and 4) mounted on the upper end of a vertical shaft 23 journaled in a bearing 24 formed in the machine base 14. The lower end of the shaft carries a pinion 25 which meshes with and is driven by a pinion 26 on a short drive shaft 27 which carries a main driving bevel gear 28. The bevel gear 28 may be rotated in any suitable manner.

The cans A preferably are fed into and are discharged from the pockets 17 of the turret 16 by a pair of spaced continuously rotating star wheels 31, 32 disposed adjacent the outer periphery of the turret as shown in Fig. 1. The entrance star wheel 31 is mounted on the upper end of a vertical drive shaft 34 journaled in a bearing bracket 35 which extends up from the machine base 14. The shaft is rotated through a train of three pinion gears 36, 37, 38 (Fig. 4), the first of which (36) is carried on the star wheel shaft 34 and the last of which (38) meshes with and is driven by the turret gear 21. The cans are received from any suitable source of supply on a table 39 (Fig. 2) and are advanced by the star wheel into the pockets 17 of the turret. A curved guide rail 41 disposed adjacent the outer periphery of the star wheel holds the cans in engagement with the wheel and directs them toward the turret pockets.

The discharge star wheel 32 is mounted on the upper end of a vertical drive shaft 43 journaled in a bearing bracket 44 which extends up from the machine base 14. The shaft is rotated by a gear 45 (Figs. 1 and 4) mounted on the lower end of the shaft and meshing with the drive gear 26. A curved guide rail 46 (Fig. 2) disposed adjacent the outer periphery of the star wheel and extending across the path of travel of the cans A in the turret 16 facilitates removal of the cans from the turret pockets 17 and directs them onto a table 47 for discharge to any suitable place of deposit.

The product to be weighed and filled into the cans A traveling with the turret 16 is contained in a rotatable reservoir 51 (Fig. 1) located above and in concentricity with the circular path of travel of the cans around the column 18. The reservoir 51 is supported on a hollow vertical pedestal 52 which rests on a ring plate 53 which in turn is mounted on a disc 54 secured to a flange 55 of a driving sleeve 56 rotatably carried in the column 18 in concentricity therewith. This entire multi-part vertical structure is rotated on the axis of the sleeve 56 in time with the turret 16 by a gear 57 which is secured to the lower end of the sleeve and which meshes with and is driven continuously by the pinion 25.

The weighing of the product into the unit charges for filling into the cans A is effected by a plurality of the weighing devices B (Figs. 1, 5 and 6) which are located immediately below the reservoir 51. There is one weighing device B for each pocket 17 of the turret 16 and each device is disposed in vertical alignment with its turret pocket. Each device B includes a product feeding or dispensing nozzle 61 which depends from the bottom of the reservoir 51 and which communicates with an opening 62 in the bottom of the reservoir. There is one opening 62 for each weighing device B.

Figure 6:
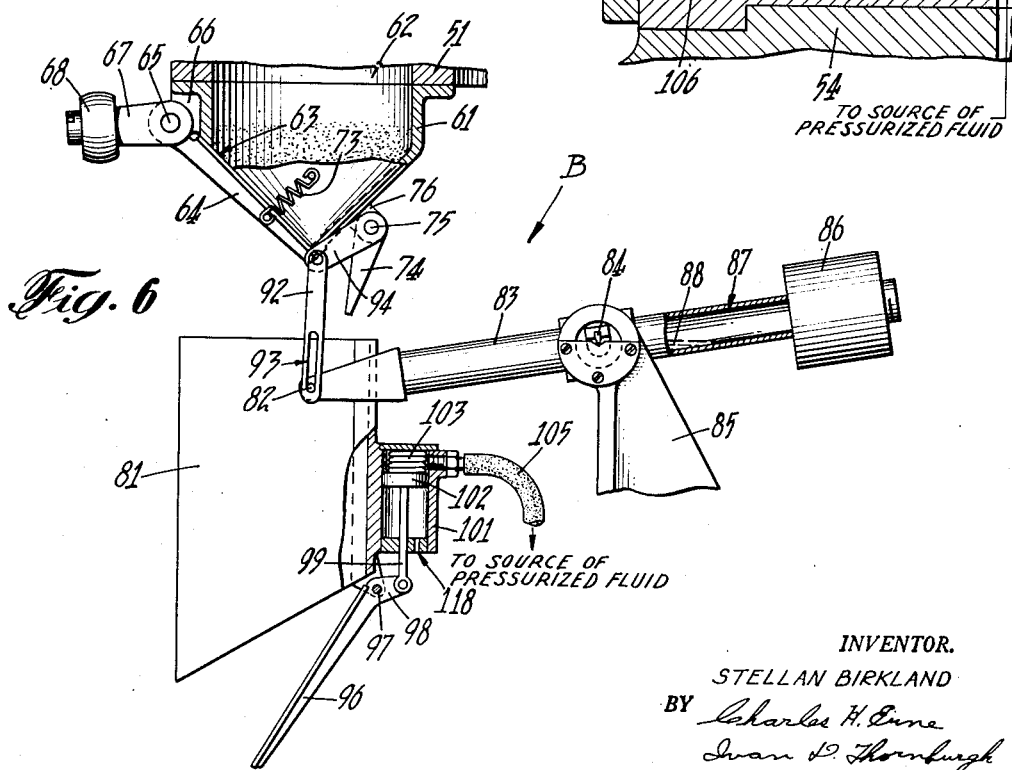

The lower end of the nozzle 61 is shaped as an inverted cone and its outwardly facing wall is formed with a dispensing slot 63 which is normally closed by a hinged trap door 64 as shown in Fig. 6. The upper end of the door 64 is mounted on a pivot pin 65 carried in lugs 66 formed on the nozzle. This upper end of the door is also formed with an outwardly projecting arm 67 which carries a cam roller 68 disposed in a path of travel intersected by a short stationary cam 69 (see also Fig. 2) mounted on a post 71 extending up from the machine base 14. The cam 69 is located in a predetermined position relative to the travel of a can A with the turret 16 so that the weighing operation may be completed in sufficient time to permit filling the can before it reaches the discharge star wheel 32.

Figure 5:
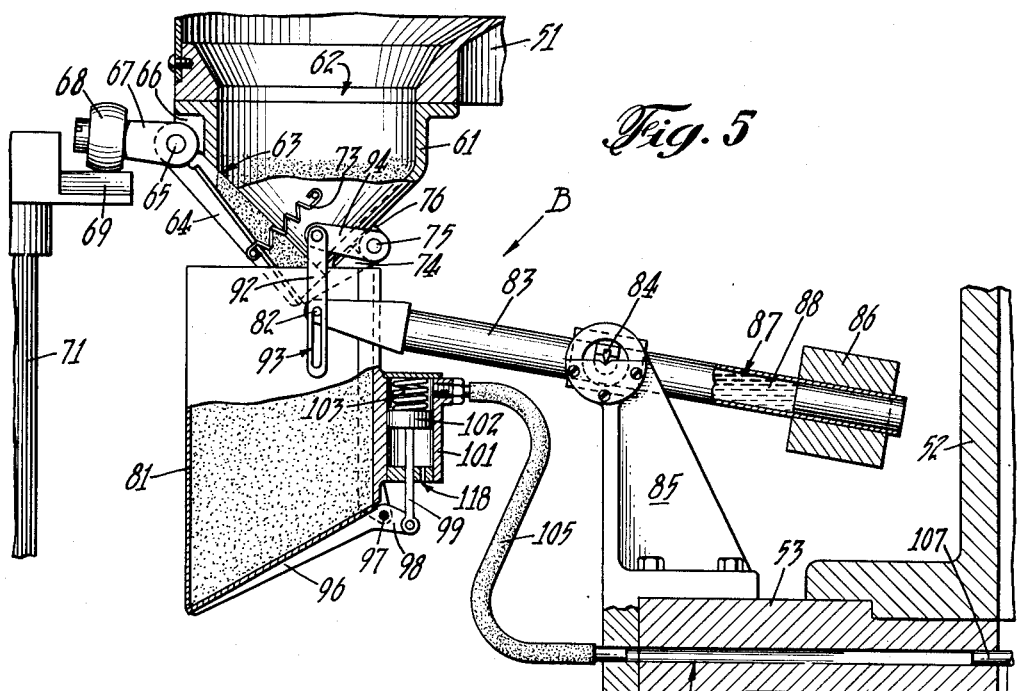
Figs. 5 and 6 are enlarged part vertical sectional and part side elevational views of one of the weighing devices in the machine, the two views showing the movable parts of the devices in different positions.

Engagement of the cam roller 68 with the cam 69 as the roller passes the cam in traveling with the reservoir, lifts the roller and thus rocks the arm 67 upwardly. This action swings the trap door 64 downwardly into an open position, as shown in Fig. 5. The door opens against the resistance of a spring 73 which is stretched between the door and a pin secured in the outer wall of the nozzle. In opening, the free lower edge of the door 64 slides along a door locking and tripping finger 74 which is mounted on a pivot pin 75 carried in lugs 76 formed on the back of the nozzle 61. When the door is fully open it rides off the finger 74 and the finger is weight urged to snap under the door as shown in Fig. 5 to hold the door open after the cam roller 68 rides off the cam 69, as will be hereinafter described.

The opening of the trap door 64 permits the granular product in the reservoir 51 to discharge from the open dispensing slot 63 of the nozzle 61. The discharging product flows into a weighing bucket 81 which is disposed directly below the nozzle 61 in vertical alignment with the nozzle and with the pockets 17 of the turret 16. There is one weighing bucket 81 for each nozzle for weighing out a charge of the product for filling into the cans A in the turret 16. Each weighing bucket 81 is connected by a pair of pivot pins 82 to the outer bifurcated end of a weighing beam 83 balanced on a knife edge 84 supported on a bucket 85 secured to the rotatable ring plate 53. The inner end of the weighing beam 83 carries an adjustable weight 86 which is adjusted to compensate for the weight of the bucket 81 and to terminate the flow of the product from the nozzle 61 into the weighing bucket when a charge of a predetermined weight of the product has been received in the bucket.

In order to provide for quick sensitive tilting action of the balance beam 83 on its knife edge 84, the beam preferably is made of tubing so as to provide an interior chamber 87. This chamber 87 is partially filled with a rapidly flowable substance or fluid 88. It has been found that mercury is very suitable for this purpose since it is heavy and readily flowable. When the weighing bucket 81 is empty the counterbalance weight 86 tilts the inner end of the beam downward as shown in Fig. 5 and the mercury flows into this end of the beam and its weight augments and co-operates with the weight 86 in holding the bucket 81 steady in elevated position.

When the product charge falling into the bucket 81 approaches the predetermined weight and thus institutes a tilting action on the balance beam to weigh or move the bucket down, it overcomes the weight of the counterbalance 86 and the inner end of the beam slowly rises. At this point in the balancing operation the mercury starts to flow into the outer end of the beam, leveling off in the beam when the beam is exactly balanced and then flows rapidly into the outer end of the beam to accelerate the beam tilting movement and thus further quickly lower the bucket 81 to cut off further flow of the product into the bucket. The product thus received in the bucket constitutes the unit charge to be filled into a can A.

Cutting off the flow of the product into the weighing bucket 81 is effected by a delayed action trip mechanism, for example preferably through a pair of links 92 disposed one on each side of the nozzle 61. These links have elongated slots 93 in their lower ends. The bucket pivot pins 82 preferably are of sufficient length to extend into the slots in these links. The upper ends of the links are pivotally connected to a pair of arms 94 which are secured to the pivot pin 75 of the locking finger 74; the arms 94, the pin 75 and the finger 74 being secured together in a predetermined relation to act as a unitary structure. The slots 93 in the links 92 are of just sufficient length to permit the bucket pivot pin 82 to engage the links at the upper ends of the slots as shown in Fig. 5 to hold the locking finger 74 up in locking position when the empty weighing bucket 81 is elevated by the weight 86 and the mercury 88 in the balance beam. The lower extremities of the slots are disposed so that the bucket pivot pin 82 will engage the links at the bottoms of the slots when the bucket 81 has received the full charge of the product and has tilted the balance beam 83 as explained above (see Fig. 6).

Hence when a sufficient quantity of the product has discharged from the nozzle 61 into the weighing bucket 81 so as to constitute a product charge of a predetermined weight, the weight of the product charge first institutes a tilting of the balance beam 83 and immediately thereafter through the above described accelerated tilting movement, draws down on the links 92. This pulling on the links, draws down on the arms 94 and thus swings the locking finger 74 away from the trap door 64 of the nozzle 61 (see Fig. 6). This releases the door 64 and the spring 73 thereupon snaps it shut, thereby cutting off any further flow of the product from the nozzle. This completes the weighing operation and the entire quantity of the product received in the weighing bucket 81 constitutes the product charge to be filled into a can A. This weighing operation takes place while the reservoir 51, the attached nozzle 61 and the weighing bucket 81 are moving with the aligned can A in the turret 16.

As soon as the product charge has been weighed out, it is immediately discharged from the weighing bucket 81 through the bottom of the bucket which is normally closed by a hinged bottom plate 96 (Figs. 1, 5 and 6). The plate adjacent one edge is mounted on a pivot pin 97 carried in support lugs which extend out from the bucket. Adjacent the pivot pin, the bottom plate 96 is formed with a short arm 98, the outer end of which is connected to a vertically disposed piston rod 99. The rod 99 extends up into a cylinder 101 attached to the back of the weighing bucket. Within the cylinder, the rod 99 carries a piston 102. A compression spring 103 interposed between the top of the piston 102 and the upper end wall of the cylinder 101 maintains a downward pressure on the piston and keeps the bottom plate 96 normally closed as shown in Fig. 5.

Swinging of the bottom plate 96 into open position, as shown in Fig. 6, to discharge the weighed charge of the product from the bucket 81, preferably is effected by fluid pressure, such as a vacuum created in the cylinder 101 above the piston 102. For this purpose, the interior of the upper end of the cylinder 101 is connected by a flexible tube 105 to a radial bore 106 (Fig. 5) formed in the ring plate 53 which rotates with the vertical driving sleeve 56. There is one bore 106 in the ring plate 53 for each weighing bucket 81. The inner ends of these bores 106 are connected by pipes 107 (see also Fig. 1) which extend down through the driving sleeve 56 to a rotatable valve head 108 secured to and rotating with the lower end of the sleeve. This valve head 108 is formed with a flat lower face which seats against and rotates on a similar flat face of a stationary valve head 109 (Fig. 1) secured to the machine base 14.

At the rotatable valve head 108, the lower ends of the pipes 107 terminate in communication with radial bores 111 formed in the head and extending out to the flat face of the head. The terminal ends of these bores 111 are arranged in a circle concentric with the axis of the sleeve 56 (see Fig. 3) and are adapted to rotate into register with a short vacuumizing groove 112 and a long separate vent groove 113 formed in the flat face of the stationary valve head 109. The vacuumizing groove 112 is connected by continuing vertical and horizontal channels 114 in the stationary valve head 109, to a lead-in pipe 115 which leads from any suitable source of vacuum. The vent groove 113 is connected by similar continuing vertical and horizontal channels 116 in the stationary valve head 109 which lead to the outside atmosphere.

Hence when a bore 111 of the rotating valve head 108 comes into register with the short vacuumizing groove 112 of the stationary valve head 109, a direct line of communication is established through the associated pipe 107 with the interior of the upper portion of the cylinder 101 and this creates a vacuum in the cylinder sufficient to move the piston 102 upwardly against the force of the spring 103. This upward movement of the piston opens the bottom plate 96 of the bucket 81 and permits the weighed charge of the product to discharge from the bucket into the can A located under the bucket.

The bottom plate 96 of the weighing bucket 81 remains open a sufficient time to insure full discharge of the weighed product and then the bore 111 moves out of register with the vacuum groove 112 and moves into register with the vent groove 113. The bore 111 remains in register with this vent groove 113 for the remainder of the cycle of operation of the machine until the next vacuumizing operation is required. When the bore 111 comes into register with this vent groove 113, the interior of the upper portion of the cylinder 101 is vented to the outside atmosphere through the pipe 107, bore 111, groove 113, and the vent bores 116 in the stationary valve head 109. This breaks the vacuum in the cylinder and permits the spring 103 to close the bottom plate 96 of the bucket 81 for a subsequent weighing operation. A vent port 118 (Figs. 5 and 6) in the bottom of the cylinder 101 provides for venting the air from the cylinder during the downward movement of the piston.

With the can A filled with the weighed charge of the product the can is discharged from the machine by the discharge star wheel 32 as hereinbefore explained. This completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for weighing out individual charges of a product and for filling them into cans, the combination of a hollow balance beam having a pivotal support disposed intermediate its ends, a rapidly flowable substance disposed within and partially filling said hollow beam, a weighing bucket carried on one end of said beam for receiving a product charge when said beam end is in elevated position, a nozzle for filling said product into the elevated bucket, said nozzle having a hinged door thereon normally biased by spring means to closed position, means for holding said door in open position during the bucket filling operation, a delayed action trip mechanism connecting said door holding means directly to the bucket carrying end of said balance beam, and a counterbalance weight adjustably mounted on the opposite end of said beam, tilting movement of said beam to depressed position being instituted by the weight of the product charge filled into the bucket as determined by said counterbalance weight, the resulting movement of said rapidly flowable substance within said beam thereafter quickly accelerating the tilting movement of said beam to rapidly lower said bucket, said connected trip mechanism being responsive to said accelerated tilting movement of said balance beam to release said door holding means and permit said door to be quickly returned by said spring means to its normal closed position.

2. In a machine for weighing out individual charges of a product and for filling them into cans, the combination of a balance beam, a pivotal support for said beam disposed intermediate its ends, a weighing bucket carried on one end of said beam for receiving and weighing out an individual product charge of a predetermined weight, a counterbalance weight carried by the opposite end of said beam, a feeding nozzle disposed above said weighing bucket, said nozzle having an opening for dispensing the product into said bucket, a trap door hingedly mounted on said nozzle for closing said opening in the nozzle, a trip finger movably mounted on said nozzle for holding said trap door open to permit discharge of the product from said nozzle into said bucket, and a relatively movable pin and slotted link connection between said finger and said bucket for moving said finger out of door engaging position to close said trap door and shut off the flow of product from said nozzle when the predetermined weight of the individual product charge received in the bucket is reached and movably weighs down said bucket on said pivotal support.

3. In a machine for weighing out individual charges of a product and for filling them into cans, the combination of a balance beam, a pivot support for said beam disposed intermediate its ends, a weighing bucket carried on one end of said beam for receiving and weighing out an individual product charge of a predetermined weight, a counterbalance weight on the opposite end of said beam, a feeding nozzle disposed above said weighing bucket, said nozzle having an opening for dispensing the product into said bucket, a spring urged door hingedly mounted on said nozzle for normally closing said opening, means for opening said door, a trip finger movably mounted on said nozzle and engageable with said door for holding the latter in open position after its movement thereto by said opening means to permit discharge of the product from said nozzle into said bucket, and a link connection between said finger and said bucket, said link having an elongated slot for a pin projecting from said bucket, said pin engaging said link at one end of said slot for retaining said trip finger in holding position against the door when said bucket is being filled, said pin engaging said link at the opposite end of said slot for moving said finger out of door engaging position to permit the door to close under spring tension and shut off the flow of product from said nozzle when the predetermined weight of the individual product charge received in the bucket is reached and weighs down said bucket.

4. In a machine for weighing out individual charges of a product and for filling them into cans, the combination of a multi-part structure rotatable on a vertical axis, a horizontal turret having pockets disposed concentric with and rotatable in unison with said structure for advancing cans in spaced relation along a curved path of travel, a product reservoir carried on said structure above said turret, a plurality of product feeding nozzles each having a dispensing opening depending from said reservoir and located one above each turret pocket, a trap door movably mounted on each of said nozzles for closing said nozzle openings, stationary cam means disposed adjacent the path of travel of said nozzles and engageable by means connected to said doors for momentarily opening said doors, a trip finger movably mounted on each nozzle for engaging and holding said doors open after their movement to open position by said cam means, spring means for normally exerting a closing pressure on said doors, a weighted balance beam disposed adjacent each of said nozzles, a pivot support carried on said rotatable structure for each of said beams, a weighing bucket carried on each balance beam and located under one of said nozzles for receiving therefrom and weighing out an individual product charge of a predetermined weight, a link connection between said trip finger and said nozzle trap door for moving said finger out of engagement with the door to close said door by said spring means and cut off the flow of product from said nozzle when the predetermined weight of the individual product charge received in the bucket is reached and movably weighs down said bucket on said pivot support, a movable bottom closure plate on said weighing bucket, and fluid pressure means actuated by the rotation of said structure for opening said closure plate to discharge the weighed product charge from said bucket into the can advancing with and beneath the bucket.

5. In a machine for weighing out individual charges of a product and for filling them into cans, the combination of a multi-part rotatable vertical structure, a horizontal turret having pockets disposed concentric with and rotatable in unison with said structure for advancing cans in spaced relation along a curved path of travel, a product reservoir carried on said structure above said turret, a plurality of product feeding nozzles having dispensing openings depending from said reservoir and located one above each turret pocket, a balance beam disposed adjacent each of said nozzles, a support carried on said rotatable structure for each of said beams, a weighing bucket carried on each balance beam and located under each nozzle for receiving from said nozzle and weighing out an individual product charge of a predetermined weight, means connected to said weighing bucket and said nozzle for cutting off the flow of product from said nozzle when the predetermined weight of the individual product charge received in the bucket is reached and weighs down said bucket, a bottom plate on said weighing bucket, a cylinder attached to each of said buckets, a spring pressed piston within said cylinder, a piston rod connecting said bottom plate with said piston, a valve disc carried by and rotatable with said rotatable structure, a fluid pipe connection between said cylinder and said valve disc, and a stationary valve disc communicating with a source of pressurizing fluid and co-operating with said rotatable valve disc to open and close said bottom plate to discharge the weighed product charge from said bucket into the can traveling with the bucket.

References Cited in the file of this patent
UNITED STATES PATENTS

| Number | Name | Date |
|---|---|---|
| 605,127 | Olin | June 7, 1898 |
| 924,570 | Mulloy | June 8, 1909 |
| 1,618,190 | Harkin | Feb. 22, 1927 |
| 1,891,851 | Troyer | Dec. 20, 1932 |
| 1,953,646 | Currier | Apr. 3, 1934 |
| 2,072,326 | Forster | Mar. 2, 1937 |
| 2,100,874 | Ryan | Nov. 30, 1937 |
| 2,387,585 | Howard | Oct. 23, 1945 |